United States Patent [19]

Hosoya et al.

[11] Patent Number: 5,036,411
[45] Date of Patent: Jul. 30, 1991

[54] MAGNETIC TAPE TRANSPORT MECHANISM WHICH ABSORBS MAGNETIC TAPE OSCILLATIONS AND VIBRATIONS IN THE VICINITY OF A ROTATIONAL DRUM

[75] Inventors: Atsushi Hosoya, Sagamihara; Eiichi Tsuchiya, Yokohama, both of Japan

[73] Assignee: Victor Company of Japan, Ltd., Yokohama, Japan

[21] Appl. No.: 342,777

[22] Filed: Apr. 25, 1989

[30] Foreign Application Priority Data

Apr. 26, 1988 [JP] Japan .............................. 63-56094[U]

[51] Int. Cl.⁵ .............................................. G11B 5/027
[52] U.S. Cl. .................................. 360/85; 360/130.32
[58] Field of Search ........... 360/130.3, 130.31, 130.32, 360/83, 84, 85, 130.22, 130.23, 95

[56] References Cited

U.S. PATENT DOCUMENTS

| 3,663,766 | 5/1972 | Goto | 360/84 X |
| 4,672,479 | 6/1987 | Takao et al. | 360/95 |
| 4,701,821 | 10/1987 | Muller | 360/84 X |
| 4,812,930 | 3/1989 | Sakata | 360/84 |
| 4,851,940 | 7/1989 | Saito | 360/84 |
| 4,930,028 | 5/1990 | Kunimaru et al. | 360/95 X |

Primary Examiner—Robert S. Tupper
Assistant Examiner—Andrew L. Sniezek
Attorney, Agent, or Firm—Fleit, Jacobson, Cohn, Price, Holman & Stern

[57] ABSTRACT

A magnetic tape transport apparatus including a rotary drum having a plurality of magnetic heads and spaced-apart tape entry and tape exit points; a tape path forming device including two combinations each having one guide roller and one inclined pole disposed respectively at the tape entry and tape exit points of the drum, from which points the magnetic tape begins to contact with and to leave from the drum, respectively, thereby causing the magnetic tape to partially wrap around the cylindrical surface of the drum through a predetermined angular range and to form a magnetic tape transportation path nearby the drum; and an impedance roller disposed at a position between the guide roller and the inclined pole of at least one of the combinations in contact with the magnetic tape; the impedance roller together with one combination of guide roller and inclined pole being disposed close to one of the tape entry and tape exit points of the drum when the magnetic tape is wrapped around the drum and is transported along the magnetic tape transportation path by a tape moving device.

9 Claims, 1 Drawing Sheet

MAGNETIC TAPE TRANSPORT MECHANISM WHICH ABSORBS MAGNETIC TAPE OSCILLATIONS AND VIBRATIONS IN THE VICINITY OF A ROTATIONAL DRUM

BACKGROUND OF THE INVENTION

The present invention relates to a magnetic tape transport apparatus and more particularly, to a magnetic tape transport apparatus of the type equipped with an impedance roller adapted to absorb oscillation, vibration and other undesired irregular movement of a magnetic tape and disposed at a position along a magnetic tape transportation path.

Within the magnetic tape transportation path in a video tape recorder (VTR), some oscillation and vibration suppression means are disposed in order to absorb oscillations and vibrations of the tape produced by a magnetic head drum driving motor and a motor driving other moving components of the recorder mechanism and by the frictional forces resulting from the contact of the magnetic tape being transported via guide poles and the like. In conventional VTRs, an impedance roller has been used as means for suppressing such oscillations and vibrations to prevent them from being transmitted to be picked up by the magnetic heads, whereby jitter in a recorded video signal can be reduced.

In conventional VTRs, the impedance roller is interposed between a tension pole for exerting tension to a magnetic tape unrolled from the hub of a supply reel in a magnetic cassette and a full-width erasing head disposed further along the tape path from the tension pole. However, both the tension pole and the erasing head are placed remote from a head drum by a relatively long distance. Therefore, even when oscillation and vibration are absorbed in the vicinity of the impedance roller, there is the possibility that new oscillation and vibration develop where the magnetic tape is transported between the impedance roller and the drum.

The present invention was made to substantially solve the above and other problems encountered in the conventional magnetic tape transport apparatuses and has as its object the provision of a magnetic tape transport apparatus which can effectively prevent the pickup by the magnetic heads of various oscillations and vibrations exerted to the magnetic tape being transported, thereby substantially eliminating jitter or the like.

SUMMARY OF THE INVENTION

In accordance with the invention, there is provided a magnetic tape transport apparatus for recording and reproducing data or information onto and off of the surface of a magnetic tape loaded in a tape cassette, comprising a rotary drum having a plurality of magnetic heads and spaced-apart tape entry and tape exit points; tape path forming means including two combinations each having one guide roller and one inclined pole disposed respectively at the tape entry and tape exit points of the drum, from which points the magnetic tape begins to contact with and to leave from the drum, respectively, thereby causing the magnetic tape to partially wrap around a cylindrical outer surface of the drum through a predetermined angular range and to form a magnetic tape transportation path nearby the drum; an impedance roller disposed at a position between the guide roller and the inclined pole of at least one of the combinations so as to contact with the magnetic tape; and the impedance roller together with one combination of guide roller and inclined pole being disposed extremely close to one of the tape entry and tape exit points of the drum when the magnetic tape is wrapped around the drum and is transported along the entire magnetic tape transportation path by tape moving means.

According to the present invention, therefore, since the impedance roller is disposed between the guide roller and the inclined pole, the impedance roller is disposed along the magnetic tape transportation path and in the vicinity of the drum. As a result, the impedance roller absorbs various oscillations and vibrations in the vicinity of the drum so that oscillations and vibrations which are transmitted to the magnetic heads to cause jitter or the like can be substantially decreased.

BRIEF DESCRIPTION OF THE DRAWINGS

The invention will now be described in detail with reference to the accompanying drawings wherein.

DESCRIPTION OF THE PREFERRED EMBODIMENT

Figure 1:
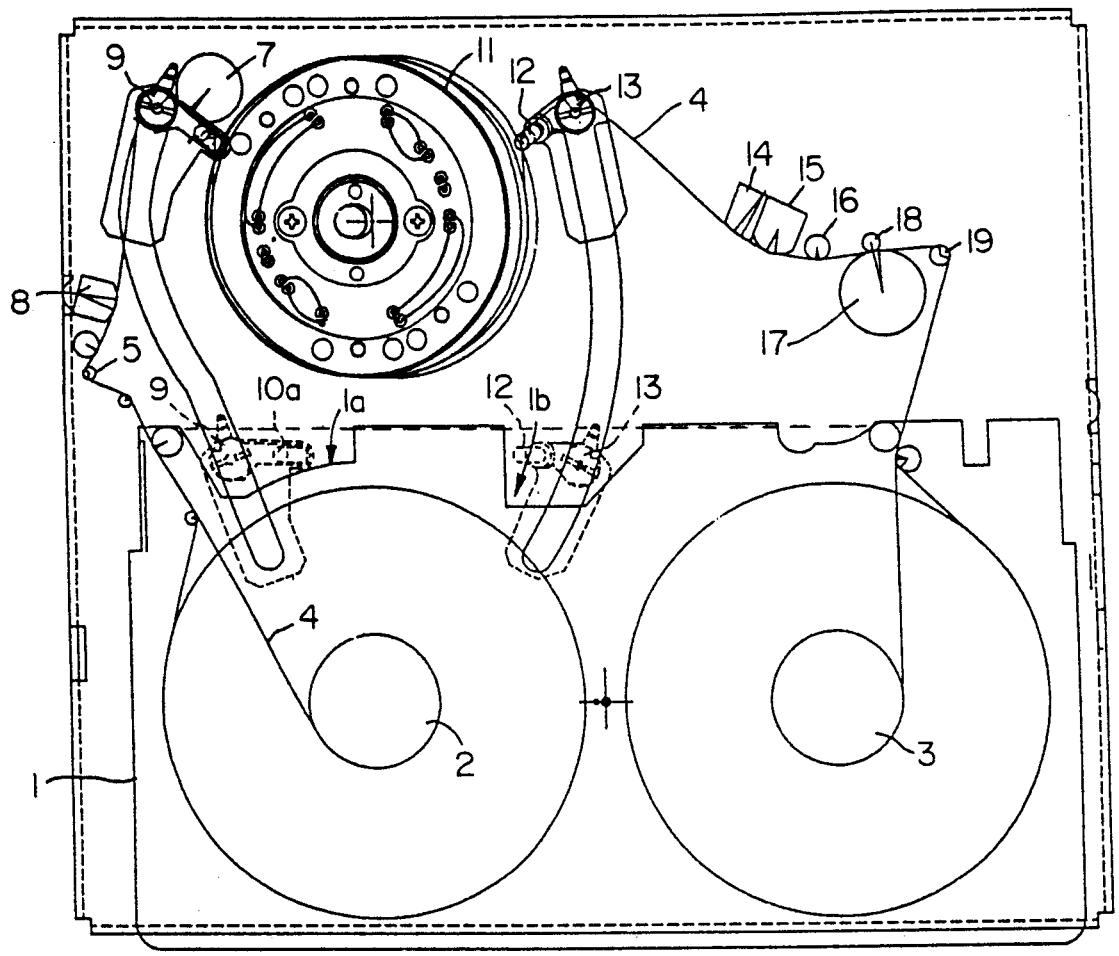
FIG. 1 is a top plan view of a schematic magnetic tape transport apparatus in accordance with the present invention.

FIG. 1 is a top plan view illustrating a magnetic tape transport apparatus in accordance with the present invention.

Prior to the insertion of tape cassette 1 into a VTR, a magnetic tape 4 is wound around a hub of a feed reel 2 and a hub of a take-up reel 3 disposed within the tape cassette 1 and stretched along a tape path shown as dashed line. Upon insertion of the tape casette 1 into the VTR and before starting the tape loading operation, tape loading movable components such as a guide roller 9 and an inclined pole 10, both of which are arranged at the side of the feed reel 2, a guide roller 13 and an inclined pole 12, both of which are arranged at the side of the take-up reel 3 are disposed respectively in cut-out portions 1a and 1b, of the tape casette 1 so that the tape loading movable components are located behind the tape path as shown in dash lines in FIG. 1.

When the magnetic tape 4 is loaded to the position shown in FIG. 1, the guide rollers 9 and 13 and the inclined poles 10 and 12 are moved in unison, by being mounted on respective supports, out from the respective cut-out portions 1a and 1b to the positions shown in solid lines in FIG. 1, so that the magnetic tape 4 is withdrawn out of the tape cassette 1. Concurrently, a pinch roller 17 is moved to a predetermined position so that the magnetic tape 4 is wrapped substantially through a predetermined angle (for instance 190°) around a drum 11 having rotary magnetic heads. The magnetic tape transportation path is then defined as shown in FIG. 1.

The magnetic tape 4 which is withdrawn from the supply reel hub 2 in the tape cassette 4, passes by way of a full-width erasing head 8 and the guide roller 9, and the inclined pole 10 by which the orientation of the magnetic tape 4 is inclined by a predetermined angle with respect to a vertical plane to a chassis base of the VTR and then is brought into contact parallel with a surface of the drum 11 so that the magnetic tape 4 is helically and semi-circularly wrapped around the drum 11.

An impedance roller 7 is installed at a position extremely close to both a tape entry position of the drum 11 and inclined pole 10 which is also very close to the drum 11 and yet the impedance roller 7 is placed between the guide roller 9 and the inclined pole 10, and is brought into contact with the magnetic tape 4 from the outside of the magnetic tape transportation path. This arrangement allows the impedance roller 7 to function at a position extremely close to the magnetic drum 11 to suppress oscillations and vibrations of the magnetic tape which may otherwise develop before contacting the drum 11 due to a motor for rotating the drum 11 and a motor for driving moving components and due to the contact of the magnetic tape 4 with the poles and the like while the magnetic tape 4 is being transported. In other words, impedance roller 7, placed extremely close to the drum 11, does not give the magnetic tape 4 a freedom for developing oscillations and vibrations possibly caused by various sources as described above, before contacting the drum 11 and the magnetic heads so that jitter in the picture can be effectively prevented.

Figure 2A:
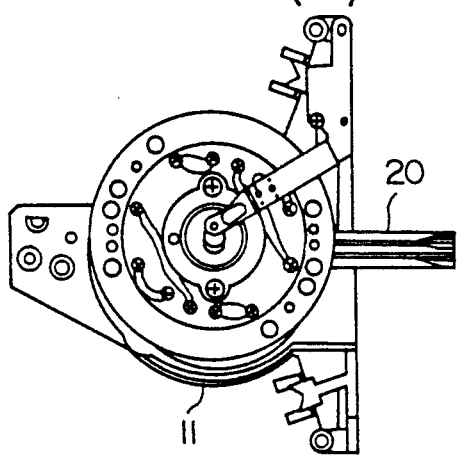
FIG. 2A is a top plan view illustrating the outer shape of a rotary drum.
Figure 2B:
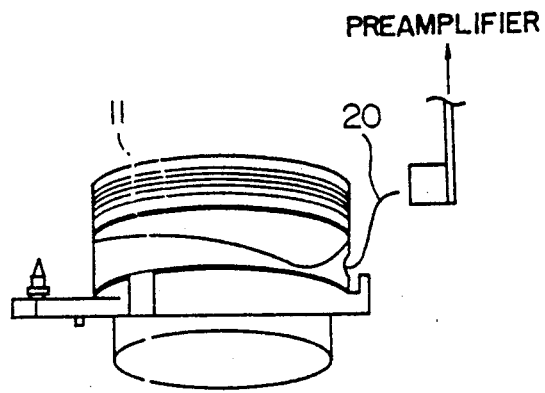
FIG. 2B is a side view of FIG. 2A.

The drum 11 has a shape as shown in FIG. 2(A) and FIG. 2(B) and is equipped with a predetermined number of magnetic heads (not shown) which rotate in unison with a rotary part (rotary drum) of the drum 11. The signals to be recorded or read out by the magnetic heads are transmitted through a rotary transformer within the drum 11 and amplified by an exterior preamplifier. As shown in FIGS. 2(A) and 2(B), the electrical interconnection between the drum 11 and the exterior preamplifier is established by a flexible wire 20. Therefore, the relay circuit boards and the connectors hitherto needed otherwise are eliminated so that the signal transmission lines are shortened and the space factor for such components is efficiently improved. Furthermore, it becomes possible to reduce the number of components, to simplify the fabrication process and to reduce the fabrication costs.

When the rotary drum of the drum 11 rotates at a predetermined rotational speed, the magnetic heads (not shown) disposed on the surface of the rotary drum records or reproduces the video and audio signals onto or off of the surface of the magnetic tape 4. Thereafter, the magnetic tape 4 leaves the drum 11 from its exit points and is transported by way of the inclined pole 12, the guide roller 13, an audio and erasing head 14, an audio and control signal head 15 and a tape guide 16 by means of a capstan 18 and a pinch roller 17 which interpose the magnetic tape 4 therebetween and drive the same. After passing past the tension pole 19, the magnetic tape 4 is taken up by the take-up reel 3 in the tape cassette 1.

As described above, according to the preferred embodiment, the impedance roller 7, the guide roller 9 and the inclined pole 10, are concentrated together and disposed extremely close to the tape entry point at which the magnetic tape 4 begins to contact the drum 11 so that various oscillations and vibrations exerted to the magnetic tape 4 during the transportation thereof, are prevented and therefore the function of suppressing oscillations and vibrations of the impedance roller 7 becomes effective. It was confirmed from test results that jitter components in the medium range from 100 to 1000 Hz in particular are remarkably decreased.

Furthermore, when the magnetic tape is loaded, the position of the impedance roller 7 is outside of the tape transportation path so that the shaft of the impedance roller 7 can be securely fixed to form a stationary impedance roller. Otherwise, the impedance roller together with its shaft must be made movable to move away from the ways of the drawing out magnetic tape and of other moving mechanical components. That is, a mechanism for moving the impedance roller 7 can be eliminated so that the entire magnetic tape transport apparatus can be made more compact in size.

In the case of the preferred embodiment of the present invention, the impedance roller 7 has been described as being interposed between the guide roller 9 and the inclined pole 10 on the side of the supply reel 3, but it may be also possible that the impedance roller 7 is disposed between the guide roller 13 and the inclined pole 12 on the side of the take-up reel 3 for the same effect. However, it is to be noted that according to the test results, the impedance roller 7 being interposed between the guide roller 9 and the inclined pole 10 on the side of the supply reel 2, is found to be more effective than when the impedance roller 7 is interposed between the guide roller 13 and the inclined pole 12 on the side of the take-up reel 3. It is also to be understood that impedance rollers 7 may be disposed respectively on both sides of the tape entry and exit points of the drum 11, i.e. the supply and take up reel sides.

As described above, according to the present invention, one or more impedance rollers are disposed extremely close to the drum, oscillations and vibrations of the magnetic tape produced by the rotation of the motors and by the frictional forces generated by the contact of the moving magnetic tape with the poles and the like, can be absorbed in the vicinity of the drum, and the present invention has a feature that jitter, especially that in the medium range from 100 to 1000 Hz, can be remarkably reduced to a minimum.

We claim:

1. A magnetic tape transport mechanism comprising:
   a rotary drum having a cylindrical surface portion and a plurality of magnetic heads and spaced-apart tape entry and tape exit points;
   tape path forming means including one movable guide roller and one movable inclined pole engageable with one side of the tape and disposed on one side of said drum and a second movable guide roller and second movable inclined pole engageable with said one side of the tape and disposed on the other side of said drum, said rollers and poles being movable to withdraw the tape out of a cassette and wrap the tape partially around said surface of said drum in position for use where said one roller and pole are at said tape entry point of said drum and said second guide roller and second inclined pole are at said tape exit point of said drum, from which points said magnetic tape begins to contact with and to leave from said drum, respectively, thereby causing said magnetic tape to partially wrap around the cylindrical surface portion of said drum through a predetermined angular range and to form a magnetic tape transportation path near said drum;
   an impedance roller disposed at a fixed position relative to said drum between the guide roller and inclined pole of at least one of said one guide roller and one inclined pole and said second guide roller and second inclined pole and engageable with said magnetic tape, on the side of the tape opposite from said one side engageable by said rollers and poles, when said rollers and poles are in said position for use for absorbing oscillations and vibration of said magnetic tape in the magnetic tape path;

said impedance roller together with said at least one of said one guide roller and one inclined pole and said second guide roller and second inclined pole being disposed in said position for use closely adjacent to one of said tape entry and tape exit points of said drum when the magnetic tape is wrapped around said drum and is transported along said magnetic tape transportation path; and tape moving means engaging said tape for driving said tape along said tape transportation path.

2. A magnetic tape transport mechanism as claimed in claim 1, wherein said impedance roller is disposed at a side of said entry point of said drum.

3. A magnetic tape transport mechanism as claimed in claim 2, wherein said impedance roller has a stationary axis of rotation.

4. A magnetic tape transport mechanism as claimed in claim 2, wherein said one guide roller and one inclined pole are movable simultaneously together as a unit, said second guide roller and second inclined pole are movable simultaneously together as a unit, and respective one and second guide rollers and inclined poles are closely adjacent said impedance roller when in said position for use.

5. A magnetic tape transport mechanism as claimed in claim 4 wherein:

said respective one and second guide rollers and inclined poles are movable simultaneously together with respect to said drum.

6. A magnetic tape transport mechanism as claimed in claim 1, wherein said impedance roller has a stationary axis of rotation.

7. A magnetic tape transport mechanism as claimed in claim 6, wherein said one guide roller and one inclined pole are movable simultaneously together as a unit, said second guide roller and second inclined pole are movable simultaneously together as a unit, and respective one and second guide rollers and inclined poles are closely adjacent said impedance roller when in said position for use.

8. A magnetic tape transport mechanism as claimed in claim 1, wherein said one guide roller and one inclined pole are movable simultaneously together as a unit, said second guide roller and second inclined pole are movable simultaneously together as a unit, and respective one and second guide rollers and inclined poles are closely adjacent said impedance roller when in said position for use.

9. A magnetic tape transport mechanism as claimed in claim 4 wherein:

said respective one and second guide rollers and inclined poles are movable simultaneously together with respect to said drum.

* * * * *